(12) United States Patent
Chou et al.

(10) Patent No.: US 11,548,333 B2
(45) Date of Patent: *Jan. 10, 2023

(54) CHECK JOINT STRUCTURE FOR CONNECTION OF AIR NOZZLE OF TIRE AND CONNECTION HOSE OF AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 97 days.

This patent is subject to a terminal disclaimer.

(21) Appl. No.: 17/027,583

(22) Filed: Sep. 21, 2020

(65) Prior Publication Data

US 2021/0086571 A1 Mar. 25, 2021

(51) Int. Cl.
| B60C 29/06 | (2006.01) |
| B29C 73/02 | (2006.01) |
| B60C 23/00 | (2006.01) |
| B60C 29/00 | (2006.01) |
| B29C 73/16 | (2006.01) |

(52) U.S. Cl.
CPC .......... B60C 29/064 (2013.01); B29C 73/025 (2013.01); B29C 73/166 (2013.01); B60C 23/001 (2013.01); B60C 29/002 (2013.01); B60C 29/062 (2013.01)

(58) Field of Classification Search
CPC ... B60C 29/064; B60C 29/062; B29C 73/166; B60S 5/04; B29L 2030/00; F16K 15/20; Y10T 137/3724; F16L 29/04; F16L 37/40

USPC .......................................................... 141/38
See application file for complete search history.

(56) References Cited

U.S. PATENT DOCUMENTS

| 2008/0257416 A1* | 10/2008 | Hickman | ................ F16L 29/02 |
| | | | 137/223 |
| 2013/0105055 A1* | 5/2013 | Chou | ...................... B60S 5/043 |
| | | | 152/416 |
| 2013/0284312 A1* | 10/2013 | Chou | ........................ B60S 5/04 |
| | | | 141/38 |
| 2019/0193349 A1* | 6/2019 | Chou | ........................ B60S 5/04 |
| 2020/0368980 A1* | 11/2020 | Dowel | .................... F16K 15/20 |

FOREIGN PATENT DOCUMENTS

WO WO-2013110486 A1 * 8/2013 ........... B29C 73/166

* cited by examiner

*Primary Examiner* — Timothy P. Kelly (57) ABSTRACT

A check joint structure for a connection of an air nozzle of a tire and a connection hose of an air compressor, the air compressor contains: a box, a sealant supply can, and a connection hose. The box includes a body of the air compressor. The sealant supply can includes an open segment and a supply tube. The connection hose includes a first segment and a second segment. The second segment has a check connector which includes a fitting sleeve, and the fitting sleeve has a threaded orifice, a through orifice, and a projected shoulder. A cylindrical base includes a cylindrical room, a stepped coupling segment, a conduit, and a first stepped portion. A first spring is received into the cylindrical room to abut against the first stepped portion. A valve bolt includes a contacting element, at least one cutout, a head, a conical rib, and a neck.

6 Claims, 7 Drawing Sheets

CHECK JOINT STRUCTURE FOR CONNECTION OF AIR NOZZLE OF TIRE AND CONNECTION HOSE OF AIR COMPRESSOR

FIELD OF THE INVENTION

The present invention relates to a check joint structure for a connection of an air nozzle of a tire and a connection hose of an air compressor which is capable of avoiding counterflow and eruption of chemical sealant.

BACKGROUND OF THE INVENTION

A conventional air nozzle of a tire of a vehicle is used to inflate or discharge air into or from the tire. Furthermore, a conventional tire repair device is employed to feed chemical sealant and to inflate air into a tire that is broken. The tire repair device is connected with an air compressor, and a sealant supply can is connected with an outlet valve of the air compressor, wherein compressed air is controlled by a control valve to output the chemical sealant out of a connector on a distal end of a connection hose with the compressed air. However, when a connection structure of the connector of the connection hose and the air core of the tire is not operated properly, the chemical sealant easily erupts out of the connector of the connection hose.

The present invention has arisen to mitigate and/or obviate the afore-described disadvantages.

SUMMARY OF THE INVENTION

The primary aspect of the present invention is to provide a check joint structure for a connection of an air nozzle of a tire and a connection hose of an air compressor that is capable of feeding chemical sealant and inflating compressed air into a tire after the tire is broken.

Another aspect of the present invention is to provide a check joint structure for a connection of an air nozzle of a tire and a connection hose of an air compressor which is capable of avoiding counterflow and eruption of chemical sealant.

DETAILED DESCRIPTION OF THE PREFERRED EMBODIMENTS

Figure 1:
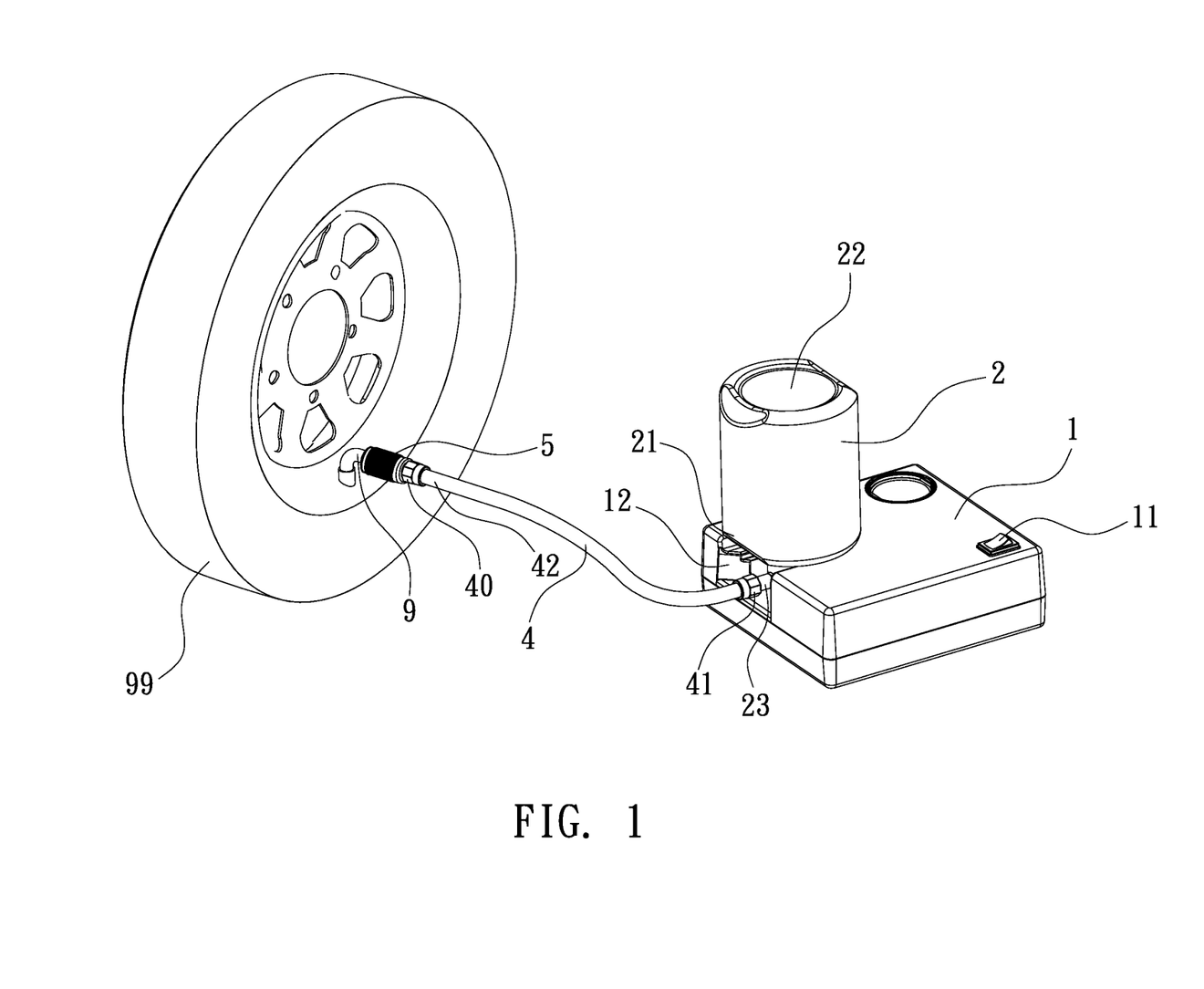
FIG. 1 is a perspective view showing the application of a check joint structure for a connection of an air nozzle of a tire and a connection hose of an air compressor according to a preferred embodiment of the present invention.
Figure 2:
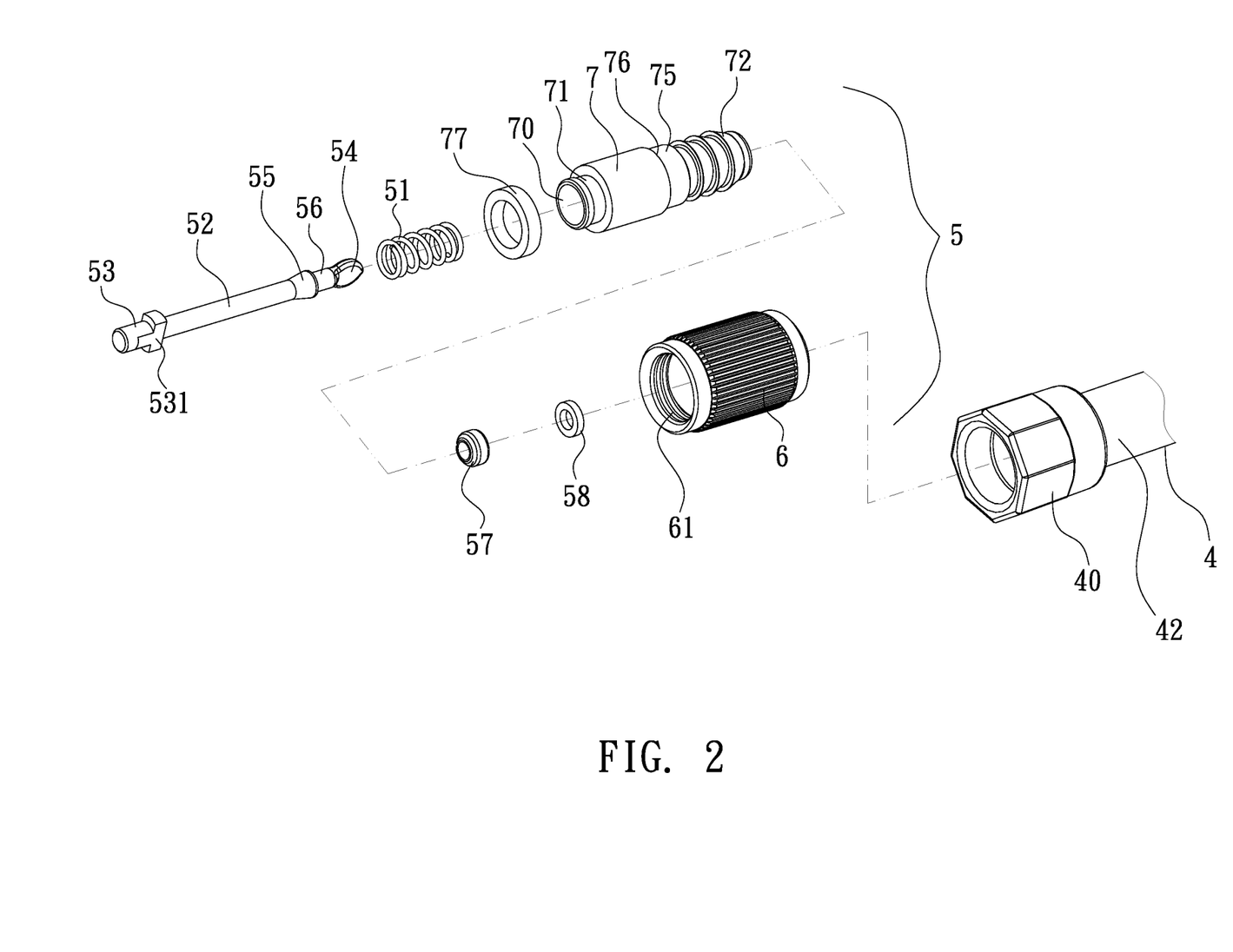
FIG. 2 is a perspective view showing the exploded components of the check joint structure according to the preferred embodiment of the present invention.

With reference to FIGS. 1-2, an air compressor according to a preferred embodiment of the present invention comprises: a box 1 sealant supply can 2, and a connection hose 4.

The box 1 includes a button 11 fixed on a top thereof, a coupling orifice 12 defined on a peripheral side thereof, and a body of the air compressor (not shown) accommodated in the box 1. The connection hose 4 includes a first segment 41 formed on a first end thereof, and the connection hose 4 also includes a second segment 42 formed on a second end thereof and having a check connector 5 connected on the second segment 42. The sealant supply can 2 is connected on the coupling orifice 12, and the tire sealant supply can 2 includes an open segment 21 extending downward, a bottom fringe 22 extending upward, and a supply tube 23 configured to engage with the first segment 41 of the connection hose 4. The check connector 5 of the second segment 42 of the connection hose 4 can screwingly engage with an air nozzle 9 of a tire 99, when feeding chemical sealant and inflating compressed air to the tire 99 that is broken. After the box 1 is started by a vehicle power supply or other DC power supply, the compressed air of the air compressor forces the chemical sealant of the sealant supply can 2 to flow into the tire 99 via the connection hose 4, thus repairing and inflating the tire 99. The tire 99 is any one of an automobile tire, a motorcycle tire, and a bicycle tire.

Figure 3:
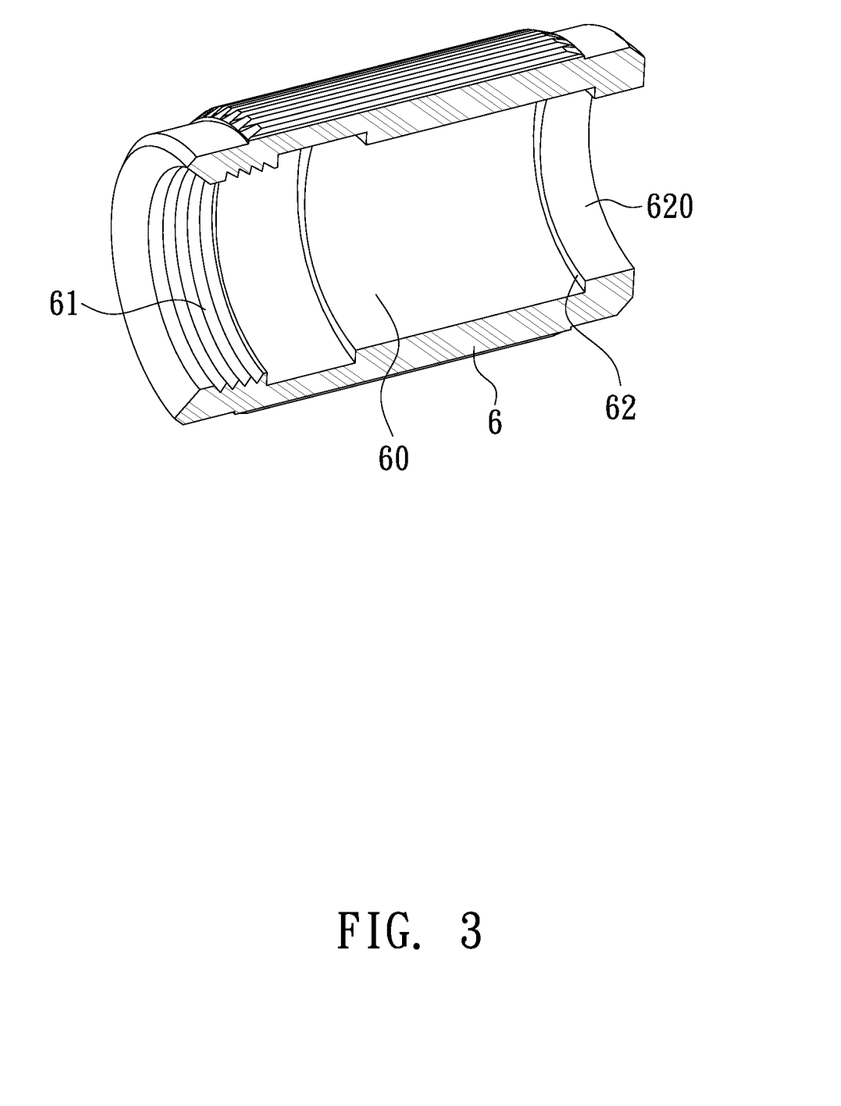
FIG. 3 is a cross-sectional perspective view showing the assembly of a fitting sleeve of the check joint structure according to the preferred embodiment of the present invention.

Referring to FIGS. 2-5, a check joint structure for a connection of the air nozzle of the tire and the connection hose of the air compressor is applied to avoid eruption of the chemical sealant, and the cheek joint structure comprises: the check connector 5 connected on the second segment 42 of the connection hose 4. The check connector 5 includes a fitting sleeve 6 (as shown in FIG. 3) formed in a cylindrical shape, and the fitting sleeve 6 has a chamber 60 defined therein. A threaded orifice 61 is formed in a first end thereof and has female threads; a through orifice 620 is defined on a second end of the fitting sleeve 6; a projecting shoulder 62 is formed on an inner wall of the chamber 60 proximate to the through orifice 620, and a diameter of the projecting shoulder 62 is more than a diameter of the through orifice 620, wherein the threaded orifice 61, the chamber 60, and the through orifice 620 are in communication with one another.

Figure 4:
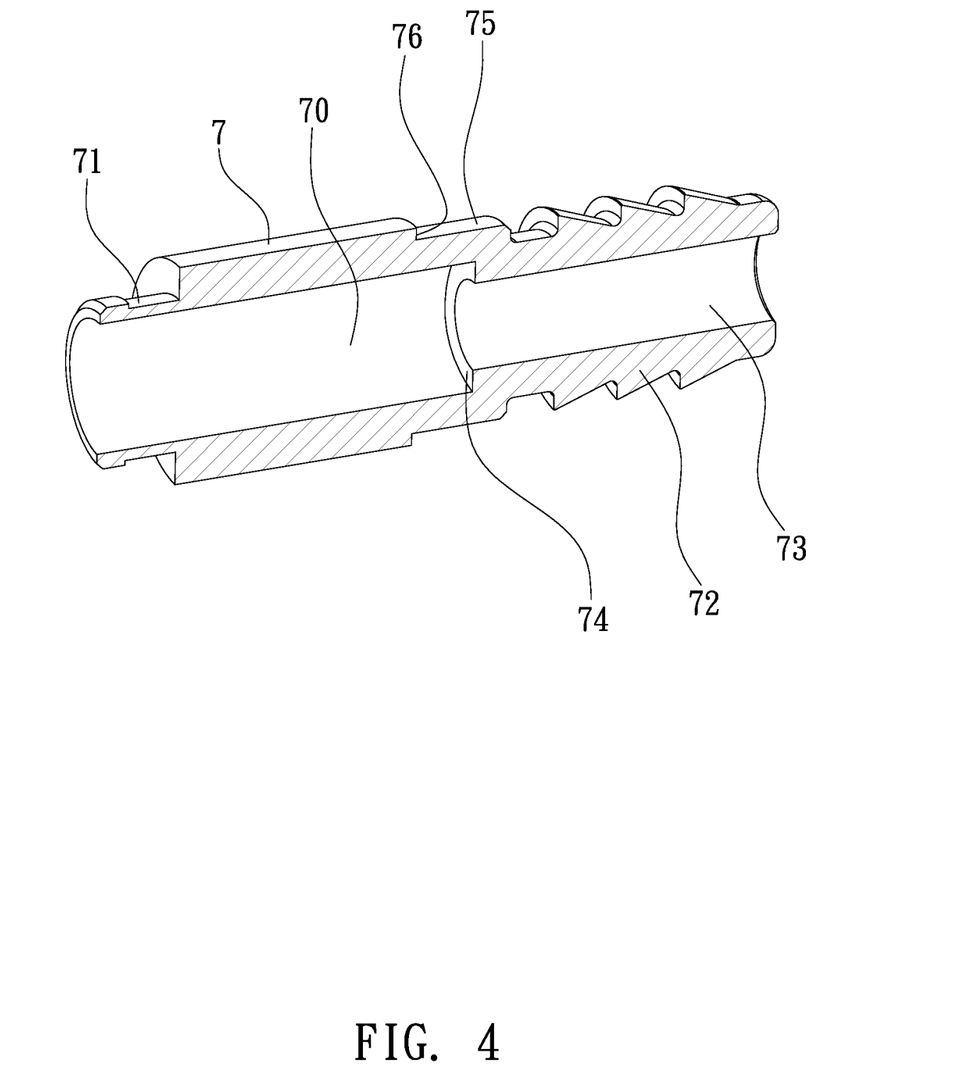
FIG. 4 is a cross-sectional perspective view showing the assembly of a cylindrical base of the check joint structure according to the preferred embodiment of the present invention.

A cylindrical base 7 (as shown in FIG. 4) includes a cylindrical room 70, a trench 71 formed on an outer wall of a first end of the cylindrical 7, a stepped coupling segment 72 extending on an outer wall of a second end of the cylindrical base 7, and a conduit 73 defined in the stepped coupling segment 72 and communicating with the cylindrical room 70, wherein a diameter of the cylindrical room 70 is more than a diameter of the conduit 73, and the cylindrical base 7 further includes a first stepped portion 74 formed between the cylindrical room 70 and the conduit 73. A recessed section 75 is formed proximate to the stepped coupling segment 72, wherein a diameter of the cylindrical base 7 is more than a diameter of the recessed section 75, and a second stepped portion 76 is defined between the cylindrical base 7 and the recessed section 75.

A first seal ring 77 is fitted on the trench 71 of the cylindrical base 7. A first spring 51 is received into the cylindrical room 70 of the cylindrical base 7 so that a first end of the first spring 51 abuts against the first stepped portion 74. A valve bolt 52, formed in a columnar shape, includes a contacting element 53 arranged on a first end of the valve bolt 52, with at least one cutout 531 defined on an outer wall of the contacting element 53. A head 54 extends from a second end of the valve bolt 52, a conical rib 55 extending from the valve bolt 52 away from the first end of the valve bolt 52 and adjacent to the head 54, wherein a largest diameter of the conical rib 55 is equal to the diameter of the conduit 73, and the valve bolt 52 includes a neck 56 formed between the conical rib 55 and the head 54, such that the second end of the valve bolt 52 is inserted through the cylindrical room 70 of the base 7 and the conduit 73 of the stepped coupling segment 72, the contacting element 53 abuts against a second end of the first spring 51, as shown in FIG. 5, and the neck 56 and the head 54 of the valve bolt 52 extend out of the stepped coupling segment 72 of the cylindrical base 7.

A first abutting loop 57 is fitted on the neck 56 of the valve bolt 52, a first end of the first abutting loop 57 abutting against the conical rib 55 of the valve bolt 52, and a second end of the first abutting loop 57 being fixed by a lock element 58, such that the first spring 51 pushes the valve bolt 52 so that first abutting loop 57 of the valve bolt 52 contacts with the stepped coupling segment 72 of the cylindrical base 7 and closes the conduit 73 of the stepped coupling segment 72.

The stepped coupling segment 72 of the cylindrical base 7 is put into the chamber 60 from the threaded orifice 61 of the fitting sleeve 6 via the through orifice 620, such that the projecting shoulder 62 contacts with the second stepped portion 76 of the cylindrical base 7. The stepped coupling segment 72 of the cylindrical base 7 extends out of the fitting sleeve 6 to connect with the second segment 42 of the connection hose 4, and a fixing bushing 40 is configured to connect the connection hose 4 and the check connector 5, as illustrated in FIG. 5. The first spring 51 forces the first abutting loop 57 of the valve bolt 52 to contact with the stepped coupling segment 72 of the cylindrical base 7 and to close the conduit 73 of the stepped coupling segment 72.

Figure 5:
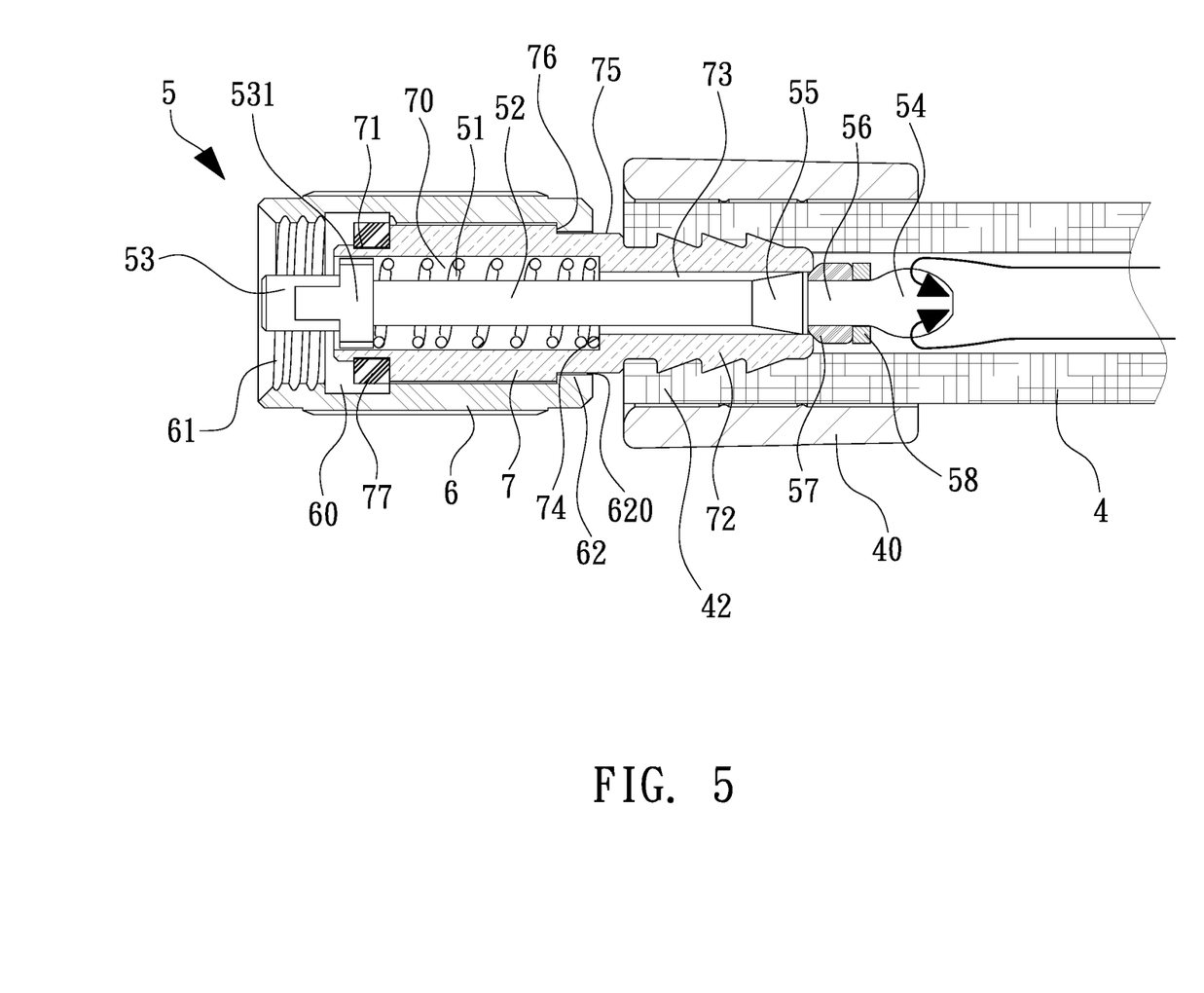
FIG. 5 is a cross sectional view showing the assembly of the check structure and the connection hose according to the preferred embodiment of the present invention.

Referring to FIG. 5, after the button 11 of the box 1 is turned on (as shown in FIG. 1), pressure of the compressed air of the air compressor forces the chemical sealant to flow, but the chemical sealant does not flow through the conduit 73 of the stepped coupling segment 72 because the first abutting loop 57 of the valve bolt 52 contacts with the coupling segment 72 of the cylindrical base 7 tightly to stop the chemical sealant flowing through the conduit 73 of the stepped coupling segment 72, thus avoiding the eruption of the chemical sealant.

Figure 6:
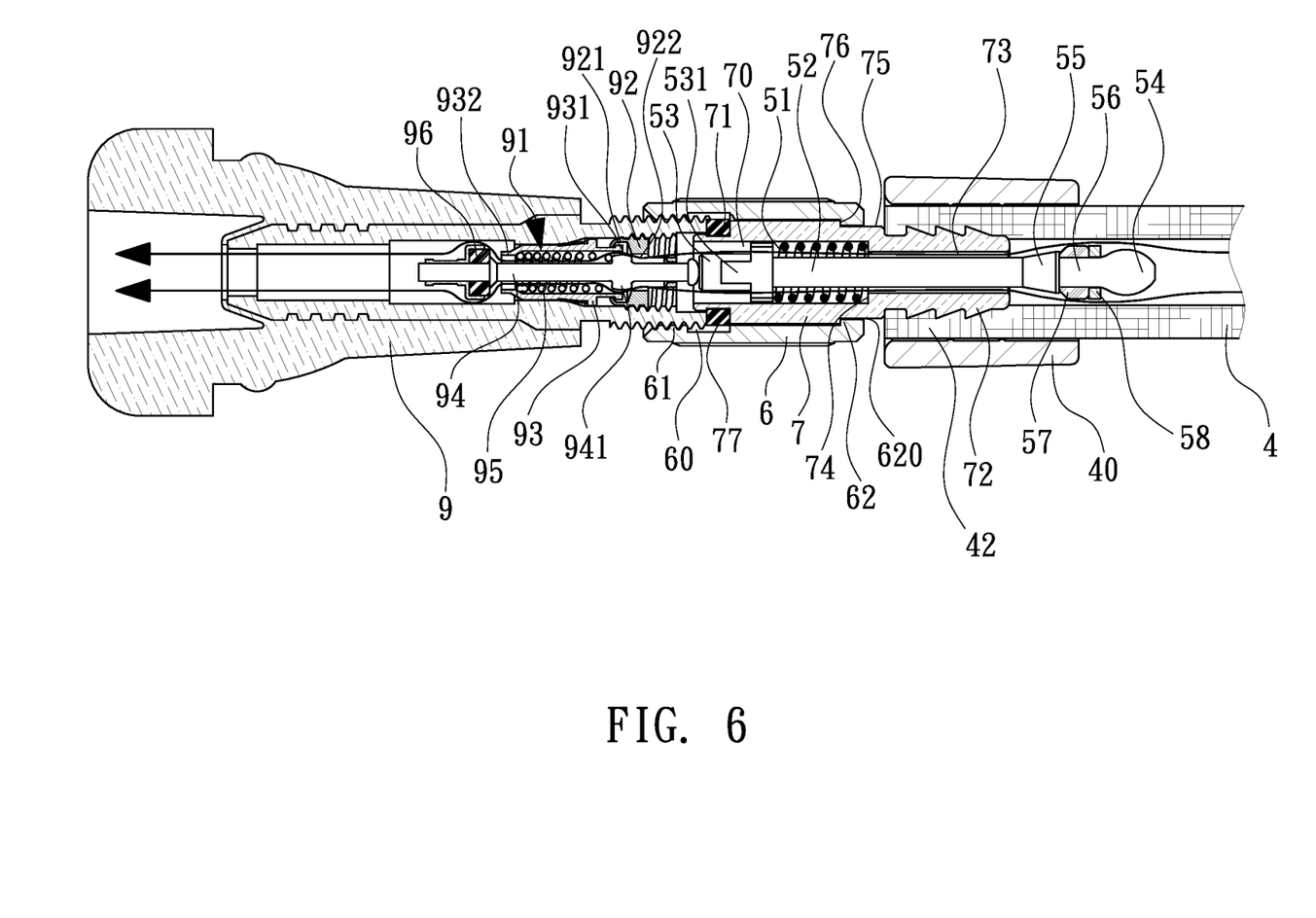
FIG. 6 is a cross sectional view showing the operation of the check joint structure according to the preferred embodiment of the present invention.
Figure 7:
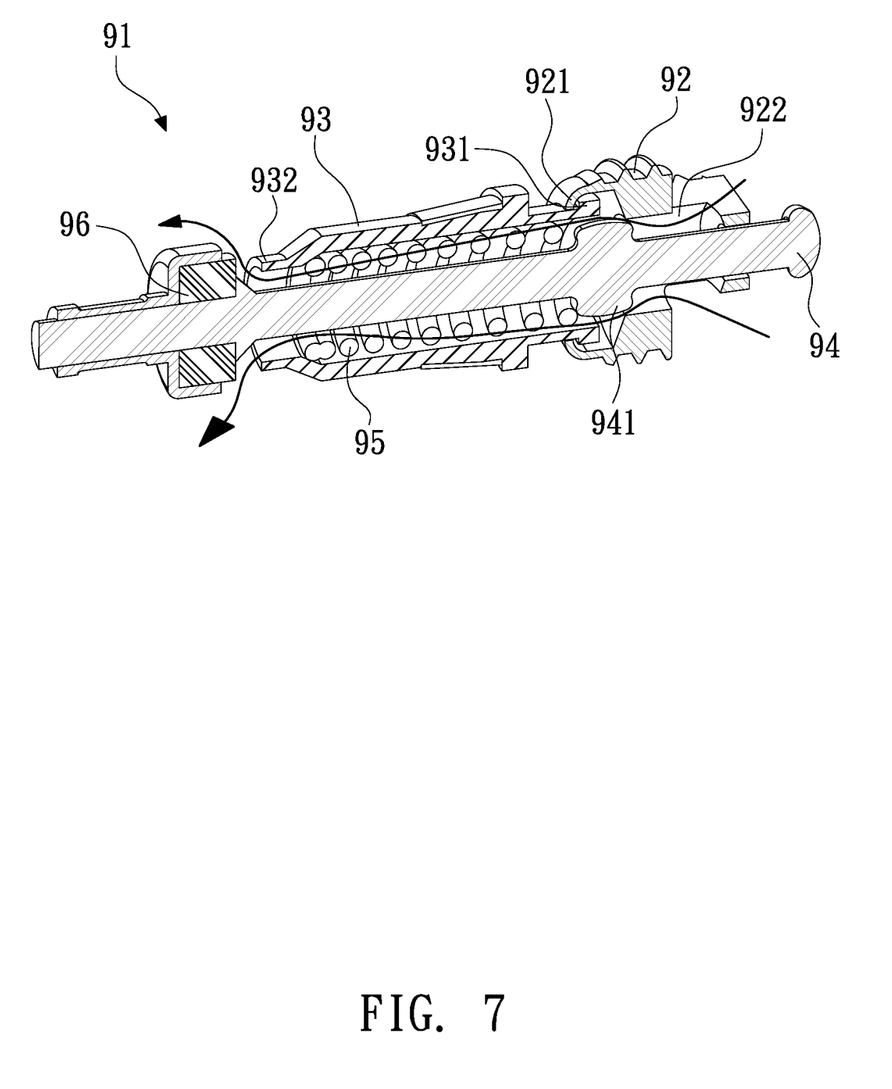
FIG. 7 is a cross-sectional perspective view showing the assembly of a valve core assembly of the air nozzle of the tire according to the preferred embodiment of the present invention.

As shown in FIGS. 6 and 7, a valve core assembly 91 is accommodated in the air nozzle 9 of the tire 99, and the valve core assembly 91 includes a mounting 92, with an arcuate stop shoulder 921 surrounding a mouth of the mounting 92 and extending inward from an end of the mounting 92, and an aperture 922 is defined in the mounting 92. A hollow receiving sleeve 93 includes a retaining shoulder 931 formed on a first end of the hollow receiving sleeve 93, and a holder 932 formed on a second end of the hollow receiving sleeve 93. A central needle 94 is formed in a columnar shape and has multiple spaced ribs 941 formed on the central needle 94. A second spring 95 is fitted with the central needle 94 and a first end of the second spring 95 abuts against the multiple spaced ribs 941 of the central needle 94. The central needle 94 is received in the hollow receiving sleeve 93 from the first end of the hollow receiving sleeve 93 so that a second end of the second spring 95 contacts with the holder 932, and the second spring 95 is surrounded by the receiving hollow sleeve 93. A second abutting loop 96 fitted on a first end of the central needle 94; wherein after the hollow receiving sleeve 93 is connected with the mounting 92, the arcuate stop shoulder 921 of the mounting 92 engages with the retaining shoulder 931 of the hollow receiving sleeve 93, a second end of the central needle 94 extends out of the aperture 922 of the mounting 92, and the second spring 95 pushes the second abutting loop 96 the central needle 94 to close the holder 932 of the hollow receiving sleeve 93.

As illustrated in FIGS. 1 and 6, when the threaded orifice 61 of the check connector 5 is screwed with the air nozzle 9 of the tire 99, the valve bolt 52 of the check connector 5 contacts with and urges the central needle 94 of the air nozzle 9 of the tire 99 to move so that the second abutting loop 96 of the central needle 94 removes from the holder 932 of the hollow receiving sleeve 93 (as shown in FIG. 7). When the threaded orifice 61 of the check connector 5 is screwed with the air nozzle 9 of the tire 99, the valve bolt 52 is urged by the central needle 94 of the air nozzle 9 to press the first spring 51 so that the first abutting loop 57 detaches from the second segment 72 of the cylindrical base 7, and the conduit. 73 of the stepped coupling segment 72 is communicated, in the meantime, the chemical sealant is pushed by the compressed air to flow into the tire 99 via the conduit 73 of the cylindrical base 7, the cylindrical room 70 of the cylindrical base 7, the at least one cutout 531 of the contacting element 53 of the valve bolt 52, the chamber 60 and the threaded orifice 61 of fitting sleeve 6, the aperture 922 of the mounting 92 of the air nozzle 9, the hollow receiving sleeve 93, and the holder 932 of the hollow receiving sleeve 93, thus feeding the chemical sealant and inflating the compressed airs to the tire 99.

Thereby, the check joint structure for the connection of the air nozzle of the tire and the connection hose of the air compressor is capable of avoiding the eruption of the chemical sealant in an incorrect operation.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention,

What is claimed is:

1. A check joint structure for connecting with an air nozzle of a tire, comprising:
   a check connector configured to connect to an end of a connection hose of an air compressor, the check connector comprising:
   a fitting sleeve, wherein the fitting sleeve has a threaded orifice formed at a first end thereof and having female threads, a through orifice defined on a second end of the fitting sleeve, and a projecting shoulder formed on an inner wall of the through orifice, wherein a diameter of the projecting shoulder is greater than a diameter of the through orifice, and the threaded orifice is in communication with the through orifice;
   a cylindrical base comprising a cylindrical room, a stepped coupling segment extending on an outer wall of a first end of the cylindrical base, and a conduit defined in the stepped coupling segment and communicating with the cylindrical room, wherein a diameter of the cylindrical room is greater than a diameter of the conduit, and the cylindrical base further includes a first stepped portion formed between the cylindrical room and the conduit;

a first spring disposed in the cylindrical room of the cylindrical base so that a first end of the first spring abuts against the first stepped portion;

a valve bolt in a columnar shape, the valve bolt comprising a contacting element arranged on a first end of the valve bolt, a second end of the valve bolt inserted through the cylindrical room of the cylindrical base and the conduit of the stepped coupling segment to extend out of the stepped coupling segment of the cylindrical base, and the contacting element abuts against a second end of the first spring; and a first abutting loop disposed on the second end of the valve bolt;

wherein the first spring pushes the valve bolt so that first abutting loop of the valve bolt contacts with the stepped coupling segment of the cylindrical base and closes the conduit.

2. The check joint structure as claimed in claim 1, wherein:

the fitting sleeve has a chamber defined therein, and the threaded orifice, the chamber, and the through orifice are in communication with one another;

the cylindrical base includes a trench formed on an outer wall of a second end thereof, and the cylindrical base includes a recessed section formed proximate to the stepped coupling segment;

wherein a diameter of the cylindrical base is greater than a diameter of the recessed section, and a second stepped portion is defined between the cylindrical base and the recessed section.

3. The check joint structure as claimed in claim 2, wherein:

a first seal ring is disposed on the trench of the cylindrical base; and the stepped coupling segment of the cylindrical base is disposed in the chamber from the threaded orifice of the fitting sleeve via the through orifice so that the projecting shoulder contacts with the second stepped portion of the cylindrical base.

4. The check joint structure as claimed in claim 3, wherein:

the valve bolt includes at least one cutout defined on an outer wall of the contacting element, a head extending from the second end of the valve bolt, a conical rib extending from the valve bolt away from the first end of the valve bolt and adjacent to the head, wherein a largest diameter of the conical rib is equal to the diameter of the conduit, and the valve bolt further includes a neck formed between the conical rib and the head, such that the neck and the head of the valve bolt extend out of the stepped coupling segment of the cylindrical base; and the first abutting loop is disposed on the neck of the valve bolt, a first end of the first abutting loop abutting against the conical rib of the valve bolt, and a second end of the first abutting loop is fixed by a lock element.

5. The check joint structure as claimed in claim 2, wherein the stepped coupling segment of the cylindrical base extends out of the fitting sleeve to connect with the end of the connection hose, and a fixing bushing is configured to connect the connection hose and the check connector together.

6. The check joint structure as claimed in claim 1, wherein a valve core assembly is accommodated in the air nozzle of the tire, and the valve core assembly includes:

a mounting, an aperture defined in the mounting;

an arcuate stop shoulder surrounding a mouth of the mounting and extending inward from an end of the mounting;

a hollow receiving sleeve having a retaining shoulder formed on a first end of the hollow receiving sleeve, and a holder formed on a second end of the hollow receiving sleeve;

a central needle having a columnar shape and comprising multiple spaced ribs formed on the central needle;

a second spring engaging with the central needle, a first end of the second spring abutting against the multiple spaced ribs of the central needle; wherein the central needle is received in the hollow receiving sleeve from the first end of the hollow receiving sleeve so that a second end of the second spring contacts with the holder, and the second spring is surrounded by the receiving hollow sleeve;

a second abutting loop disposed on a first end of the central needle;

wherein after the hollow receiving sleeve is connected with the mounting, the arcuate stop shoulder of the mounting engages with the retaining shoulder of the hollow receiving sleeve, a second end of the central needle extends out of the aperture of the mounting, and the second spring pushes the second abutting loop of the central needle to close the holder of the hollow receiving sleeve.

* * * * *